(12) United States Patent
Nukazuka et al.

(10) Patent No.: US 12,498,368 B2
(45) Date of Patent: Dec. 16, 2025

(54) PHOTORESPONSIVE LIPOSOME, COMPLEX, MEASUREMENT SYSTEM, AND MEASUREMENT METHOD

(71) Applicants: DENSO CORPORATION, Kariya (JP); JAPAN ADVANCED INSTITUTE OF SCIENCE AND TECHNOLOGY, Nomi (JP)

(72) Inventors: Akira Nukazuka, Kariya (JP); Hitoshi Kuno, Kariya (JP); Tsutomu Hamada, Nomi (JP); Katsunori Kouda, Nagakute (JP); Taira Kobayashi, Nagakute (JP)

(73) Assignees: DENSO CORPORATION, Kariya (JP); JAPAN ADVANCED INSTITUTE OF SCIENCE AND TECHNOLOGY, Nomi (JP)

( * ) Notice: Subject to any disclaimer, the term of this patent is extended or adjusted under 35 U.S.C. 154(b) by 1144 days.

(21) Appl. No.: 17/461,748

(22) Filed: Aug. 30, 2021

(65) Prior Publication Data

US 2021/0396744 A1    Dec. 23, 2021

Related U.S. Application Data

(63) Continuation of application No. PCT/JP2020/008049, filed on Feb. 27, 2020.

(30) Foreign Application Priority Data

Mar. 1, 2019   (JP) ................. 2019-037899

(51) Int. Cl.
   *G01N 33/544* (2006.01)
   *G01N 27/416* (2006.01)

(52) U.S. Cl.
   CPC ......... *G01N 33/544* (2013.01); *G01N 27/416* (2013.01)

(58) Field of Classification Search
   CPC ............................ G01N 33/586; G01N 33/544
   See application file for complete search history.

(56) References Cited

U.S. PATENT DOCUMENTS

2007/0128662 A1\* 6/2007 Isacoff .................. G01N 33/53
                                                        435/7.1

FOREIGN PATENT DOCUMENTS

| JP | 2009-257764 A | 11/2009 |
| JP | 2011-069646 A | 4/2011 |
| JP | 2011-178689 A | 9/2011 |
| JP | 2017-161317 A | 9/2017 |
| JP | 2019-051470 A | 4/2019 |

OTHER PUBLICATIONS

Diguet et al., "UV-Induced Bursting of Cell-Sized Multicomponent Lipid Vesicles in a Photosensitive Surfactant Solution", J Am Chem Soc. 2012, 134(10): pp. 4898-4904. (Discussed on pp. 5 and 8 of the specification).
Ma et al., "Target replacement strategy for selection of DNA aptamers against the Fc region of mouse IgG", Genet Mol Res. Apr. 25, 2013, 12(2): pp. 1399-1410.
Suzuki et al., "Photo-induced fusion of lipid bilayer membranes", Langmuir33 2017: pp. 2671-2676.
Hamada et al., "Membrane Disk and Sphere: Controllable Mesoscopic Structures for the Capture and Release of a Targeted Object", J. Am. Chem. Soc. 2010, 132(30): pp. 10528-10532.
Nagasaki et al., "Photo-enhancement of Transfection Efficiency with a Novel Azobenzene-based Cationic Lipid", Chem. Lett. 2003, 32(1): pp. 88-89.
Matsumoto, "control of liposome destruction with light", New DDS strategy, 2012, 48(10) (and partial English translation).
Hamada et al., "Reversible Photoswitching in a Cell-Sized Vesicle", Langmuir 2005, 21(17): pp. 7626-7628. (Discussed on p. 6 of the specification).
Sakai et al., "Photochemical Switching of Vesicle Formation Using an Azobenzene-Modified Surfactant", J. Phys. Chem. B 1999, 103(49): pp. 10737-10740. (Discussed on p. 6 of the specification).
Bisby et al., "Photosensitive liposomes as 'cages' for laser-triggered solute delivery: the effect of bilayer cholesterol on kinetics of solute release", FEBS Letters 1999, 463: pp. 165-168. (Discussed on p. 6 of the specification).

\* cited by examiner

*Primary Examiner* — Gyan Chandra
(74) *Attorney, Agent, or Firm* — Posz Law Group, PLC

(57) ABSTRACT

A complex includes photoresponsive liposomes, a first buffer solution, and a second buffer solution. Each of the photoresponsive liposomes includes a membrane that contains azobenzene compound and phospholipid and a membrane binding site that is immobilized to the membrane and bindable to a target substance. The first buffer solution is filled inside the photoresponsive liposomes. The second buffer solution exists outside of the photoresponsive liposomes. The first buffer solution has a composition that is different from that of the second buffer solution.

7 Claims, 5 Drawing Sheets

Specification includes a Sequence Listing.

PHOTORESPONSIVE LIPOSOME, COMPLEX, MEASUREMENT SYSTEM, AND MEASUREMENT METHOD

CROSS REFERENCE TO RELATED APPLICATION

The present application is a continuation application of International Patent Application No. PCT/JP2020/008049 filed on Feb. 27, 2020, which designated the U.S. and claims the benefit of priority from Japanese Patent Application No. 2019-037899 filed on Mar. 1, 2019. The entire disclosures of all of the above applications are incorporated herein by reference.

REFERENCE TO SEQUENCE LISTINGS

The present application contains Sequence Listings which have been filed electronically in ASCII format as 01_3887_TB_ST25.txt created on Aug. 26, 2021 and are 815 bytes in size and are hereby incorporated by reference in their entirety.

is a FcIII peptide

SEQ ID NO: 1

```
Asp Cys Ala Trp His Leu Gly Glu Leu Val Trp Cys Thr
1               5                   10
``` are DNA aptamers

SEQ ID NO: 2

```
taatacgact cactatagca atggtacggt acttccccac tcaccgggta cctgccgctc   60
ccaaaagtgc acgctacttt gctaa                                        85
```

TECHNICAL FIELD

The present disclosure relates to photoresponsive liposome, a complex, a measurement system, and a measurement method.

BACKGROUND

In technical fields such as biotechnology and health care, a liposome-linked immunosorbent assay (or Liposome Immunosorbent Assay, i.e., LISA) has been known as a method for measuring the amount of a target substance such as an antigen.

SUMMARY

One aspect of the present disclosure is a photoresponsive liposome including a membrane that contains azobenzene compound and phospholipid and a membrane binding site that is immobilized to the membrane and bindable to the target substance.

Another aspect of the present disclosure is a method for measuring the amount of a target substance. In the method, which is another aspect of the present disclosure, a liquid that contains the target substance is applied to a supporter to which supporter binding sites are immobilized. Each of the supporter binding sites is bindable to the target substance. The target substance is added to a liquid that contains photoresponsive liposomes. After applying the liquid that contains the target substance to the supporter and adding the target substance to the liquid that contains the photoresponsive liposomes, an unbound photoresponsive liposome that is not immobilized to the supporter is removed from the photoresponsive liposomes. After removing the unbound photoresponsive liposome, a membrane pore is formed in each of remaining photoresponsive liposomes by irradiating the remaining photoresponsive liposomes with light in a state where a first buffer solution exists inside the remaining photoresponsive liposomes and a second buffer solution exists outside of the remaining photoresponsive liposomes. After that, an amount of the target substance is measured in accordance with a change in the composition of the second buffer solution, which is caused by the light irradiation.

The photoresponsive liposome used in the method, which is another aspect of the present disclosure, includes a membrane that contains azobenzene compound and phospholipid and a membrane binding site that is immobilized to the membrane and bindable to the target substance. The membrane binding site is bindable to a second portion of the target substance that is different from a first portion of the target substance bindable to the supporter binding site.

BRIEF DESCRIPTION OF THE SEQUENCES

DESCRIPTION OF EMBODIMENT

Figure 1:
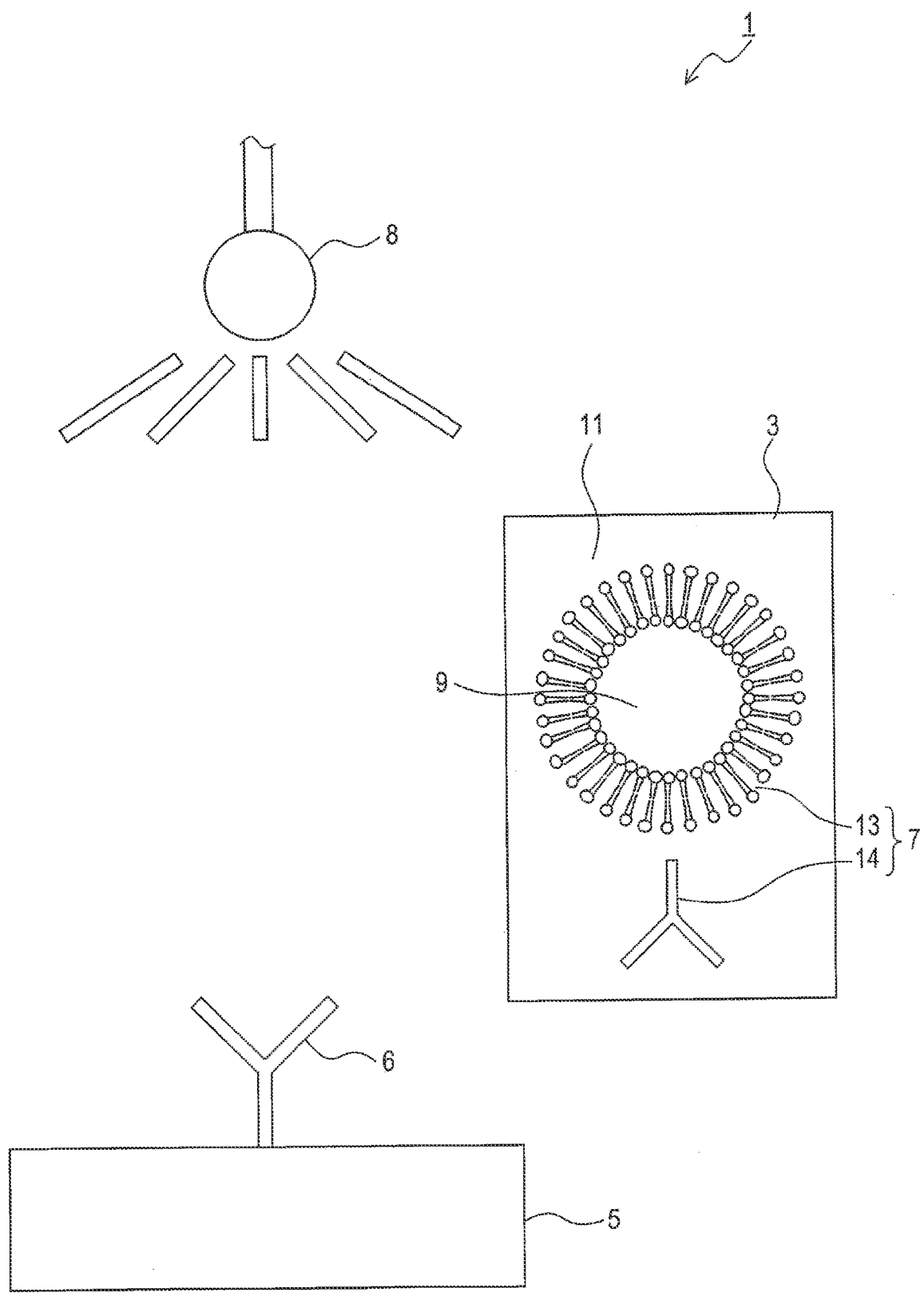
FIG. 1 is an explanatory diagram of a configuration of a measurement system.

To begin with, examples of relevant techniques will be described.

In technical fields such as biotechnology and health care, it is necessary to measure the amount of a target substance such as an antigen. As a method for measuring the amount of the target substance, a liposome-linked immunosorbent assay (or Liposome Immunosorbent Assay, i.e., LISA) has been known.

In LISA, antibodies are immobilized to a supporter. The target substances are bound to the immobilized antibodies. Next, liposomes are bound to the target substances. Each of the liposomes is incorporated with a primary antibody. The primary antibodies incorporated into the liposomes bind to the target substances.

Each of the liposomes contains therein a labeling substance such as a fluorescent molecule. Next, the labeling substance contained inside the liposomes is leaked out of the liposomes. The amount of the target substance is measured based on the amount of the labeling substance.

Detailed studies by the inventors have found the following issues. In order to leak the labeling substances contained inside the liposomes to the outside of the liposomes, it is necessary to destroy or destabilize the liposomes. In order to destroy or destabilize the liposomes, it is necessary to add peptides, proteins, surfactants and the like, or to perform ultrasonic treatment. Therefore, a complicated process is required to measure the amount of the target substance.

In one aspect of the present disclosure, it is desirable to provide a photoresponsive liposome, a complex, a measurement system, and a measurement method that can measure the amount of a target substance without necessarily performing complicated steps.

One aspect of the present disclosure is a photoresponsive liposome including a membrane that contains azobenzene compound and phospholipid and a membrane binding site that is immobilized to the membrane and bindable to the target substance.

By using the photoresponsive liposome, which is one aspect of the present disclosure, the amount of the target substance can be measured without necessarily performing complicated processes.

Another aspect of the present disclosure is a method for measuring the amount of a target substance. In the method, which is another aspect of the present disclosure, a liquid that contains the target substance is mixed with a supporter to which supporter binding sites are immobilized. Each of the supporter binding sites is bindable to the target substance. The target substance is mixed with a liquid that contains photoresponsive liposomes. After mixing the liquid that contains the target substance with the supporter and mixing the target substance with the liquid that contains the photoresponsive liposomes, an unbound photoresponsive liposome that is not bound to the supporter is removed from the photoresponsive liposomes. After removing the unbound photoresponsive liposome, a membrane pore is formed in each of remaining photoresponsive liposomes by irradiating the remaining photoresponsive liposomes with light in a state where a first buffer solution is filled inside the remaining photoresponsive liposomes and a second buffer solution exists outside of the remaining photoresponsive liposomes. After that, an amount of the target substance is measured in accordance with a change in the composition of the second buffer solution, which is caused by the light irradiation.

The photoresponsive liposome used in the method, which is another aspect of the present disclosure, includes a membrane that contains azobenzene compound and phospholipid and a membrane binding site that is immobilized to the membrane and bindable to the target substance. The membrane binding site is configured to bind to a portion of the target substance that is different from a portion of the target substance bindable to the supporter binding site.

By using the method, which is another aspect of the present disclosure, the amount of the target substance can be measured without necessarily performing complicated processes.

Hereinafter, embodiments of the present disclosure will be described with reference to the drawings.

1.1. Configuration of a Measurement System 1

A configuration of a measurement system 1 will be described with reference to FIGS. 1 to 4. As shown in FIG. 1, the measurement system 1 includes a complex 3, a supporter 5, supporter binding sites 6, and a light source 8.

Figure 2:
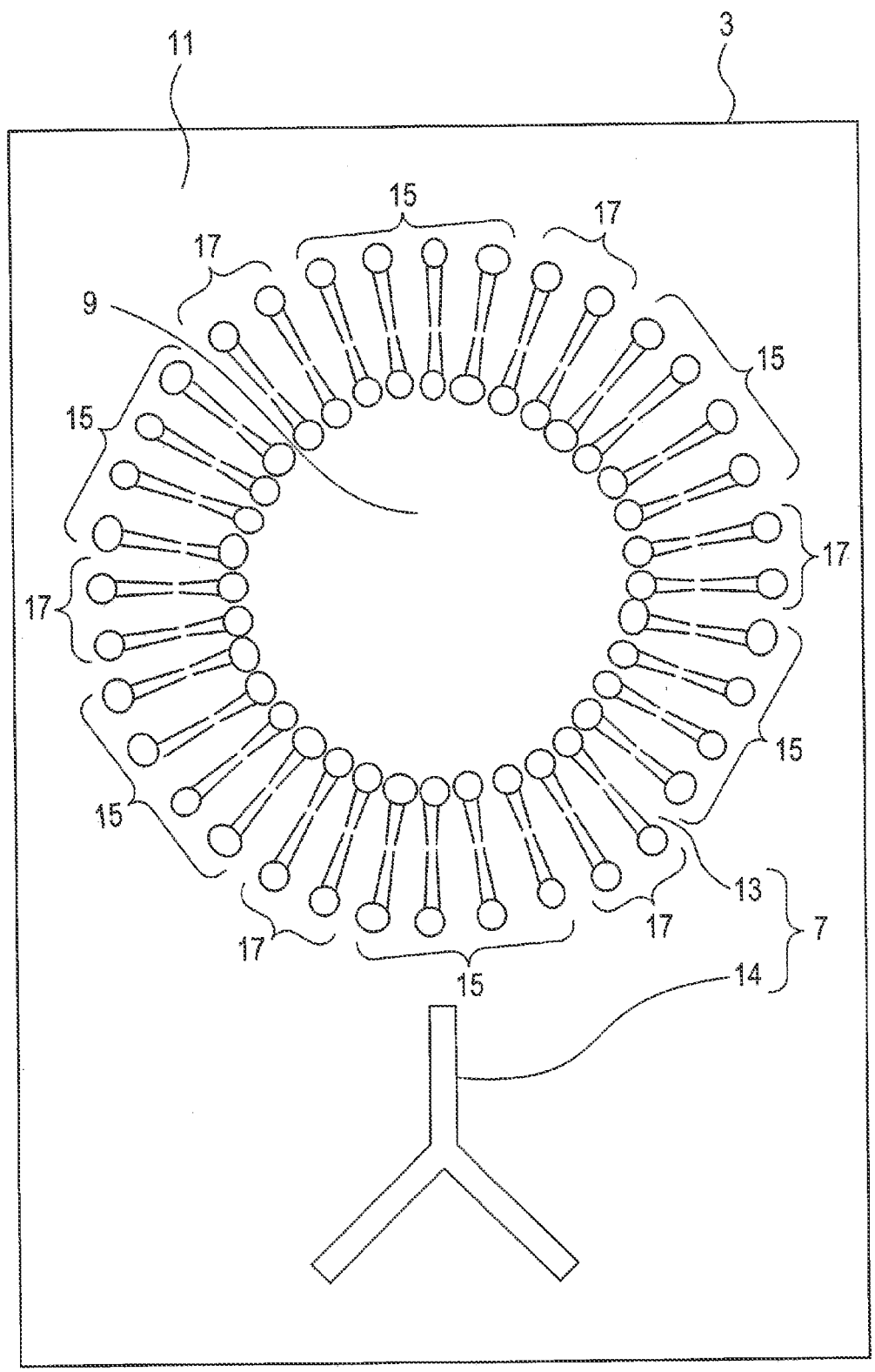
FIG. 2 is an explanatory diagram of a structure of a complex containing a photoresponsive liposome that does not define a membrane pore.
Figure 3:
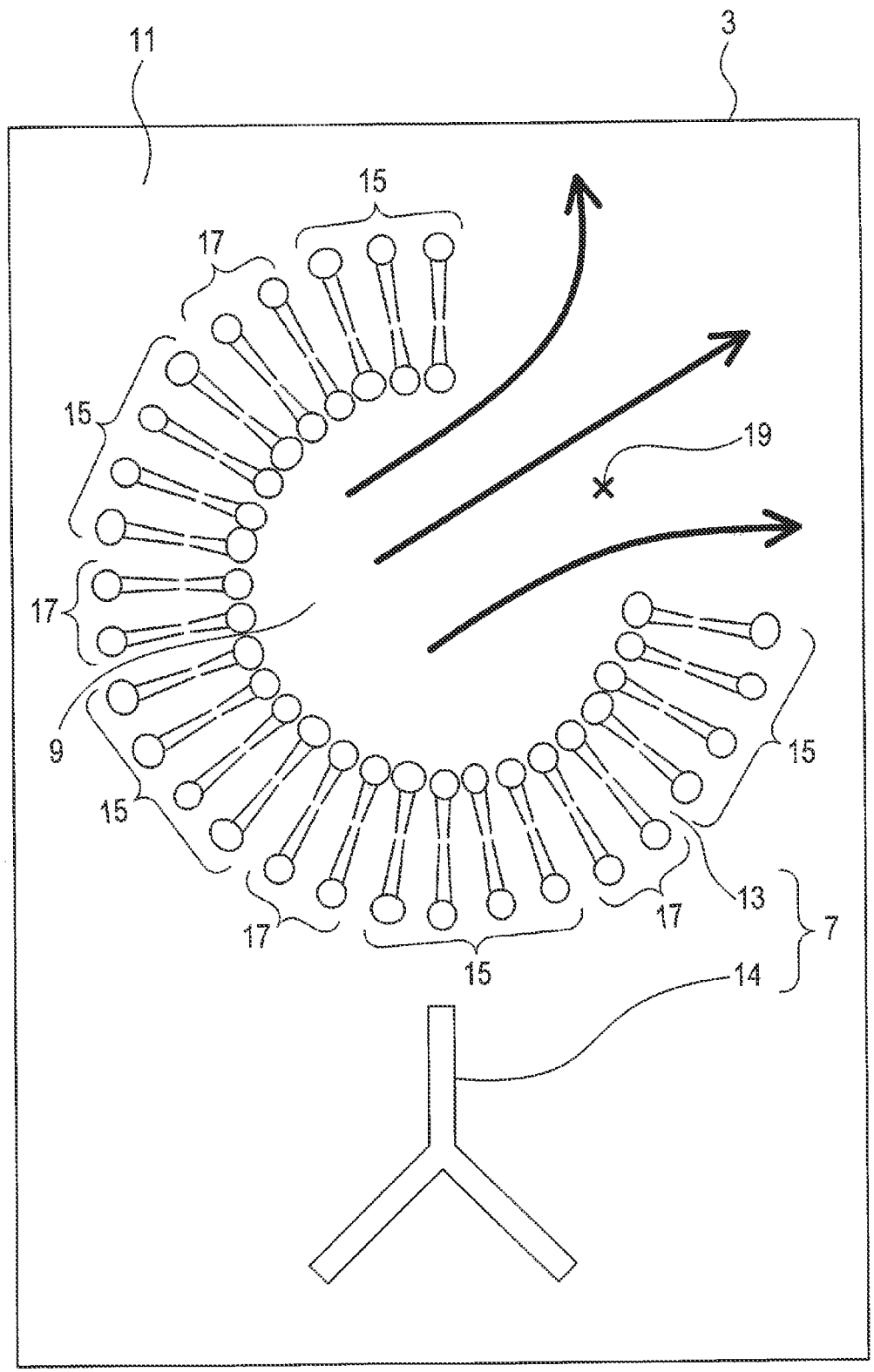
FIG. 3 is an explanatory diagram of a structure of a complex containing a photoresponsive liposome that defines the membrane pore.

As shown in FIG. 1, a complex 3 includes photoresponsive liposomes 7, a first buffer solution 9, and a second buffer solution 11. The multiple photoresponsive liposomes 7 are dispersed in the second buffer solution 11. As shown in FIGS. 1 to 3, each of the photoresponsive liposomes 7 includes a membrane 13 having a minute capsule-like morphology and a membrane binding site 14.

As shown in FIGS. 2 and 3, the membrane 13 contains phospholipids 15 and azobenzene compounds 17. Lipid means a molecule having a hydrophobic group and a hydrophilic group. The azobenzene compound 17 is transformed into trans-isomer from cis-isomer when irradiated with blue to green light. Further, the azobenzene compound 17 is transformed into cis-isomer from trans-isomer when irradiated with ultraviolet light.

Examples of the azobenzene compound 17 include AzoTAB, KAON, AZTMA, Pazo PC, and the like. In particular, AzoTAB and KAON are preferable from the viewpoint of photoreactivity.

The name of AzoTAB is azobenzene trimethylammonium bromide. Details of AzoTAB are disclosed in J Am Chem Soc. 2012 Mar. 14; 134 (10): 4898-904 and disclosures thereof are incorporated herein by reference. The name of KAON is N-[4-[4'-[N,N-bis-[3-(N-lysylamino)propyl]aminocarbonyl]phenylazo]phenoxyacetyl]didodecylamine. As KAON, there are KAON8, KAON12, and the like. The number of carbon atoms in the hydrophobic group in KAON8 is 8. The number of carbon atoms in the hydrophobic group in KAON12 is 12. KAON12 is transformed into cis-isomer from trans-isomer when irradiated with green light. In addition, KAON12 is transformed into trans-isomer from cis-isomer when irradiated with ultraviolet light. Details of KAON are disclosed in Langmuir 2005, 21, 17, 7626-7628 and disclosures thereof are incorporated herein by reference.

The name of AZTMA is 4-butylazobenzene-4'-(oxyethyl) trimethylammonium bromide. Details of AZTMA are disclosed in J. Phys. Chem. B 1999, 103, 49, 10737-10740 and disclosures thereof are incorporated herein by reference.

The name of Pazo PC is 1-hexadecanoyl-2-(4'-n-butylpeneyl)azo-4"(γ-phenylbutyroyl)-glycero-3-phosphocholine. Details of the Pazo PC are disclosed in FEBS Lett. 1999 Dec. 10; 463 (1-2): 165-8 and disclosures thereof are incorporated herein by reference.

It is preferable to use, as the phospholipid 15, unsaturated lipid that has a double bond in at least one hydrophobic group. Examples of such phospholipid 15 include dioleoylphosphocoline (hereinafter referred to as DOPC), stearoyloleoylphosphocholine (hereinafter referred to as SOPC), dipalmitoylphosphatidylcholine (hereinafter referred to as DPPC), 1,2-distearoyl-sn-glycero-3-phosphoethanolamine-polyethyleneglycol2,000-dibenzocyclooctine (hereinafter referred to as DSPE-PEG(2000)-DBCO), and the like.

The name of DOPC is 1,2-dioleoyl-sn-glycero-3-pospho-choline. The name of DPPC is 1,2-dipalmitoyl-sn-glycero-3-phosphocholine. The name of DSPE-PEG(2000)-DBCO is 1,2-distearoyl-sn-glycero-3-phophoethanolamine-N-[dibenzocychlooctyl(polyethylene glycol)-2000].

The gel-liquid crystalline phase transition temperature of the phospholipid 15 is preferably lower than an operating temperature of the photoresponsive liposomes 7 from the viewpoint of membrane formation. The gel-liquid crystalline phase transition temperature is also referred to as a solidifying temperature. The operating temperature of the photoresponsive liposomes 7 means the temperature of the photoresponsive liposomes 7 when measuring the amount of a target substance 21 using the photoresponsive liposomes 7, as will be described later.

The operating temperature of the photoresponsive liposomes 7 is usually between an ambient temperature and a body temperature. When the gel-liquid crystalline phase transition temperature of the phospholipid 15 is lower than the operating temperature of the photoresponsive liposomes 7, the phospholipid 15 is in a liquid crystalline phase at the operating temperature of the photoresponsive liposomes 7. The gel-liquid crystalline phase transition temperature of DOPC is −23° C. The gel-liquid crystalline phase transition temperature of SOPC is 6° C.

When the azobenzene compound 17 is KAON, the gel-liquid crystalline phase transition temperature of the phospholipid 15 is preferably lower than the operating temperature of the photoresponsive liposomes 7. In this case, the linear tension of the membrane 13 is switched during the cis-trans isomerization of KAON. As a result, the photoresponsive liposomes 7 exhibit reliable photoresponsiveness. When the azobenzene compound 17 is AzoTAB, the photoresponsive liposomes 7 are preferably as follows.

In each of the photoresponsive liposomes 7, for example, a first phospholipid, a second phospholipid, and a cholesterol are mixed. The first phospholipid is a phospholipid 15 having a gel-liquid crystalline phase transition temperature that is lower than the operating temperature of the photoresponsive liposomes 7. The second phospholipid is a phospholipid 15 having a gel-liquid crystalline phase transition temperature that is higher than the operating temperature of the photoresponsive liposomes 7.

Figure 4:
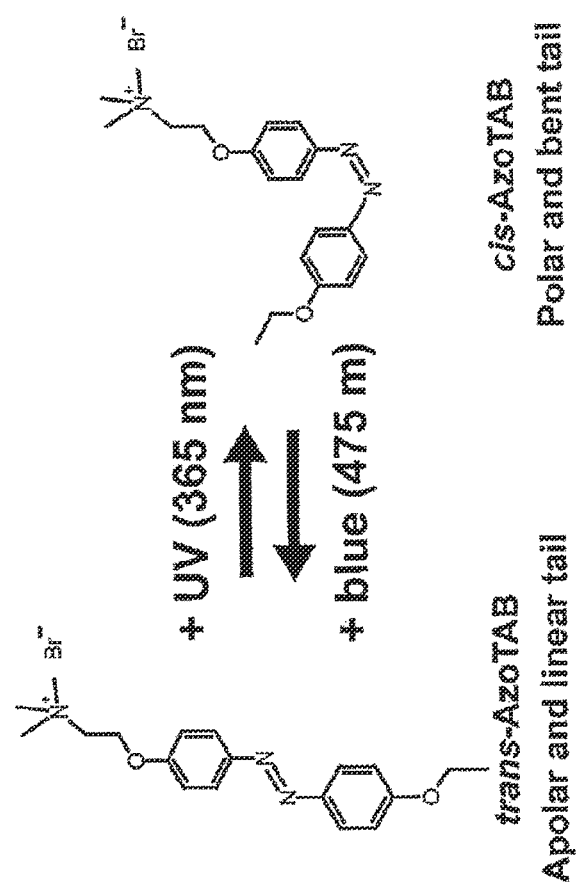
FIG. 4 is an explanatory diagram showing isomerism between cis-trans isomers of AzoTAB.

When the photoresponsive liposomes 7 are as described above, the first phospholipid, the second phospholipid that has the gel-liquid crystalline phase transition temperature different from that of the first phospholipid, and the cholesterol are mixed. As a result, phase separation occurs in the membrane 13 such that an ordered phase and a disordered phase coexist. As a result, for example, the cis-trans isomerization exhibited by AzoTAB causes a collapse of the membrane 13. The isomerization of AxoTAB between trans-cis isomers is shown in FIG. 4.

The total of a concentration of the azobenzene compound 17 and a concentration of the phospholipid 15 is set to 100%. The unit of concentration is molar concentration. When the azobenzene compound 17 is KAON 12, the concentration of the azobenzene compound 17 is preferably more than 30% and less than 40%. When the concentration of the azobenzene compound 17 is greater than 30% and less than 40%, the photoresponsive liposomes 7 can be reliably obtained.

When the azobenzene compound 17 is AzoTAB, the concentration of the azobenzene compound 17 is preferably more than 5% and less than 20%. When the concentration of the azobenzene compound 17 is greater than 5% and less than 20%, the photoresponsive liposomes 7 can be reliably obtained.

As the phospholipid 15, for example, those disclosed in J Am Chem Soc. 2012; 134(10): 4898-4904 can be used and disclosures thereof are incorporated herein by reference. Examples of the phospholipid 15 include a phospholipid including a phospholipid having an unsaturated hydrocarbon chain and a phospholipid having a saturated hydrocarbon chain.

As shown in FIG. 3, the photoresponsive liposome 7 forms a membrane pore 19 on the membrane 13 when irradiated with a first light. The membrane pore 19 fluidly connects between an inside and an outside of the photoresponsive liposome 7. When the membrane pore 19 is defined, the first buffer solution 9 existing inside the photoresponsive liposome 7 is released outward of the photoresponsive liposome 7.

Further, as shown in FIG. 2, the membrane pore 19 on the membrane 13 is closed when the photoresponsive liposome 7 is irradiated with the second light. When the azobenzene compound 17 is KAON, green light can be used as the first light and ultraviolet light can be used as the second light. The green light (i.e., the first light) is, for example, light having a wavelength of 500 nm to 600 nm. The green light which is the first light preferably has a peak near 532 nm. The ultraviolet light (i.e., the second light) is, for example, light having a wavelength of 300 nm to 400 nm.

When the azobenzene compound 17 is AzoTAB, ultraviolet light can be used as the first light. The ultraviolet light (i.e., the first light) is, for example, light having a wavelength of 300 nm to 400 nm. The ultraviolet light (i.e., the first light) preferably has a peak near 365 nm.

The formation and disappearance of the membrane pore 19 in the photoresponsive liposome 7 is due to the following actions. Upon irradiation with light, the azobenzene compound 17 is transformed from one of cis-trans isomers into the other. As a result, the photoresponsive liposome 7 containing the azobenzene compound 17 is deformed to define or close the membrane pore 19 on the membrane 13.

The membrane 13 can be formed, for example, by a laminated membrane hydration method. The laminated membrane hydration method is, for example, the following method. First, lipid molecules containing the azobenzene compound 17 and the phospholipid 15 are dissolved in an organic solvent such as chloroform to prepare a solution. The prepared solution is poured into a test tube and the organic solvent is evaporated to prepare a laminated membrane on a bottom of the test tube. The laminated membrane is a bimolecular membrane. Next, tris hydrochloric acid buffer solution is added into the test tube. Then, the laminated bimolecular membranes are separated into vesicles, and photoresponsive liposomes 7 are produced.

The membrane binding site 14 is immobilized to the membrane 13. The membrane binding site 14 can be bound to the target substance 21. The membrane binding site 14 is, for example, a molecular recognition element. Examples of the molecular recognition element include antibodies, DNA aptamers, peptides, and the like. The membrane binding site 14 can be appropriately selected according to the target substance 21.

The method of immobilizing the membrane binding site 14 to the membrane 13 is not particularly limited. For example, the membrane binding site 14 can be immobilized to the membrane 13 by forming a covalent bond between the membrane binding site 14 and the membrane 13 based on a click chemistry. In this case, it is preferable that at least one end of the membrane binding site 14 be modified with an azide group.

As shown in FIGS. 1 to 3, the first buffer solution 9 exists inside the membranes 13. The second buffer solution 11 exists outside of the membranes 13. The composition of the first buffer solution 9 and the composition of the second buffer solution 11 are different from each other.

For example, an ion gradient exists between the first buffer solution 9 and the second buffer solution 11. Examples of the ion gradient include a proton gradient. The ion gradient may be an ion gradient of ions other than protons. When there is a proton gradient between the first buffer solution 9 and the second buffer solution 11, pH of the first buffer solution 9 may be higher or lower than pH of the second buffer solution 11.

The difference between the osmotic pressure of the first buffer solution 9 and the osmotic pressure of the second buffer solution 11 is preferably within ±1 mOsm/Kg. In this case, the photoresponsive liposomes 7 can be restricted from rupturing or contracting. Examples of the first buffer solution 9 and the second buffer solution 11 include tris-hydrochloric acid buffer solution and the like. The pH of the first buffer solution 9 and the pH of the second buffer solution 11 are preferably within the range of 5.0 to 10.0.

The supporter 5 is not particularly limited. Examples of the supporter 5 include a supporter used in a known Enzyme-linked immunosorbent assay (i.e., ELISA). For example, the supporter 5 may be a silicon substrate.

The supporter binding sites 6 are immobilized to the supporter 5. Each of the supporter binding sites 6 can be bound to the target substance 21. The supporter binding site 6 is bound to a first portion of the target substance 21 that is different from a second portion of the target substance to which the membrane binding site 14 is bound.

The supporter binding site 6 is, for example, a molecular recognition element. Examples of the molecular recognition element include antibodies, DNA aptamers, peptides, and the like. The supporter binding site 6 can be appropriately selected according to the target substance 21. The method for immobilizing the supporter binding sites 6 to the supporter 5 is not particularly limited and a known method can be appropriately selected.

The light source 8 can irradiate at least a part of the photoresponsive liposomes 7 with light. The light emitted by the light source 8 is, for example, the first light or the second light described above. Further, for example, the light source 8 can selectively emit the first light and the second light. Further, the light source 8 may include a light source 8 configured to emit the first light and a light source 8 configured to emit the second light. The light source 8 may irradiate an entire of the complex 3 with light, or may locally irradiate a part of the complex 3 with light.

2.2. Measurement Method

The amount of the target substance 21 can be measured with the measurement system 1. The method includes, for example, the following first to fourth steps.

Figure 5:
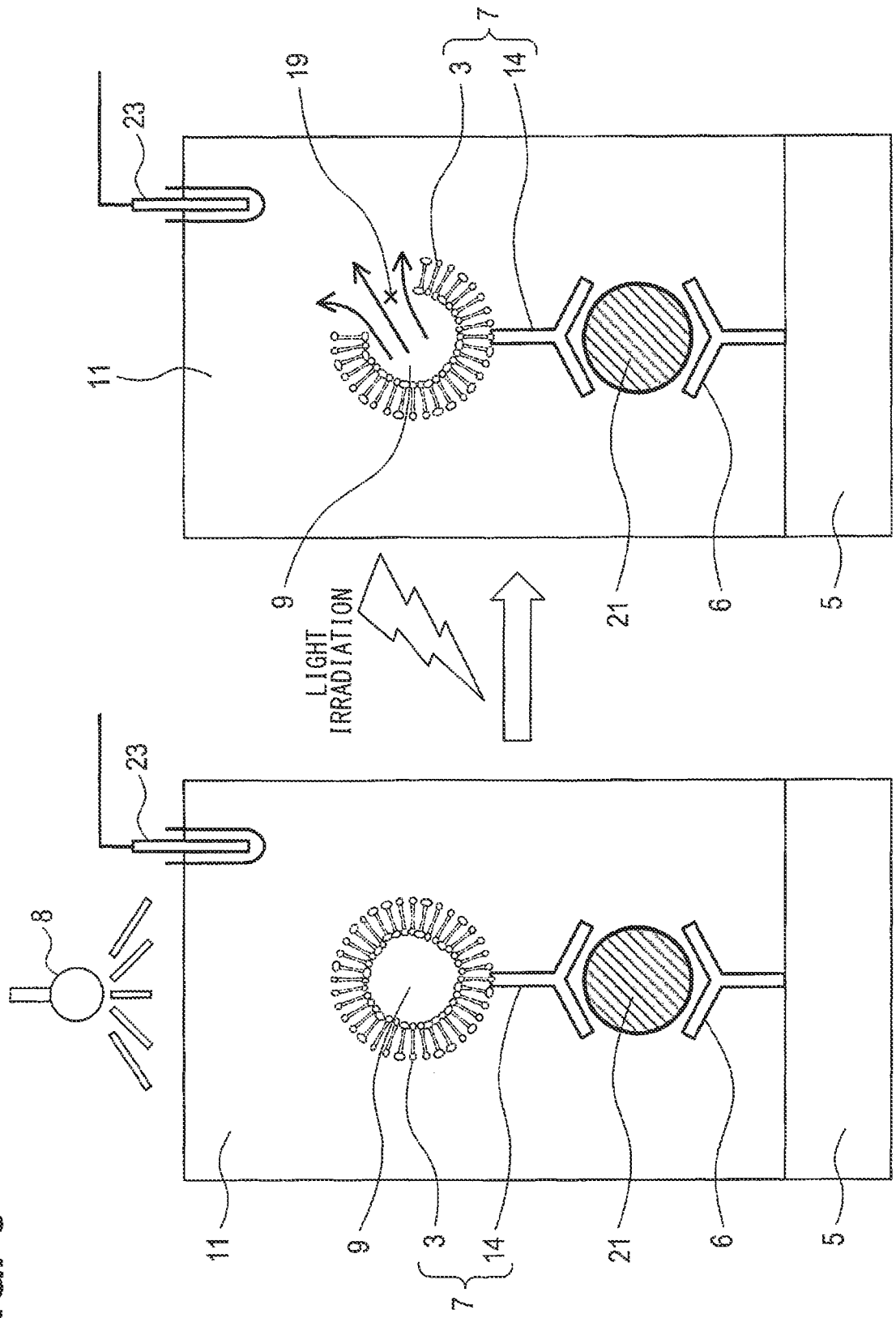
FIG. 5 is an explanatory diagram of a method for measuring the amount of a target substance using the measurement system.

In the first step, the supporter 5 on which the supporter binding sites 6 are immobilized is brought into contact with the liquid containing the target substance 21. In the first step, as shown in FIG. 5, the supporter binding sites 6 are bound to the target substances 21. The target substances 21 are immobilized to the supporter 5 through the supporter binding sites 6.

In the second step, the target substances 21 are brought into contact with the liquid containing the photoresponsive liposomes 7. The liquid containing the photoresponsive liposomes 7 is, for example, the complex 3. In the second step, the membrane binding sites 14 are bound to the target substances 21.

The second step may be a step of bringing the supporter 5 into contact with the liquid containing the photoresponsive liposomes 7 after the first step. In this case, the target substances 21 bound to the supporter 5 are brought into contact with the liquid containing the photoresponsive liposomes 7.

The second step may be a step of mixing a liquid containing the target substances 21 and a liquid containing the photoresponsive liposomes 7 to generate a mixed liquid before the first step. In this case, the target substances 21 in the liquid come into contact with the liquid containing the photoresponsive liposomes 7. Next, the supporter 5 and the mixed solution are brought into contact with each other. The step of bringing the supporter 5 into contact with the mixed solution corresponds to the first step. The mixed liquid corresponds to the liquid containing the target substances 21.

After the first step and the second step, as shown in FIG. 5, the membrane binding sites 14 are bound to the target substances 21. The photoresponsive liposomes 7 are bound to the supporter 5 through the binding between the membrane binding sites 14 and the target substances 21 and the binding between the target substances 21 and the supporter binding sites 6.

The third step is performed after the first step and the second step. In the third step, unbound photoresponsive liposomes that are not bound to the supporter 5 are removed.

The fourth step is performed after the third step. In the fourth step, as shown in FIG. 5, the remaining photoresponsive liposomes 7 are irradiated with the first light in a state where the first buffer solution 9 exists inside the photoresponsive liposomes 7 and the second buffer solution 11 exists outside the photoresponsive liposomes 7 to define the membrane pores 19. The first light is, for example, ultraviolet light. The remaining photoresponsive liposomes 7 in the fourth step mean the photoresponsive liposomes 7 bound to the supporter 5, as shown in FIG. 5.

When the membrane pores 19 are formed, the first buffer solution 9 existing inside the photoresponsive liposomes 7 is released outward of the photoresponsive liposomes 7 through the membrane pores 19. The released first buffer solution 9 is mixed with the second buffer solution 11 existing outside of the photoresponsive liposomes 7. Since the composition of the first buffer solution 9 is different from the composition of the second buffer solution 11, the composition of the second buffer solution 11 changes as compared with that before the irradiation of the first light. That is, the composition of the second buffer solution 11 is changed by the irradiation of the first light.

The larger the amount of the photoresponsive liposomes is, the larger the change in the composition of the second buffer solution 11 is. The amount of the remaining photoresponsive liposomes 7 increases as the amount of the target substance 21 increases. Therefore, the larger the amount of the target substance 21 is, the larger the change in the composition of the second buffer solution 11 is. In the fourth step, the amount of the target substance 21 is measured based on the change in the composition of the second buffer solution 11, which is caused by the irradiation of the first light.

For example, when an ion gradient exists between the first buffer solution 9 and the second buffer solution 11 before the irradiation of the first light, the ion concentration of the second buffer solution 11 is changed by the irradiation of the first light. In the fourth step, the amount of the target substance 21 is measured based on the change in the ion concentration of the second buffer solution 11 caused by the irradiation of the first light.

For example, if there is a proton gradient between the first buffer solution 9 and the second buffer solution 11 before the irradiation of the first light, the pH of the second buffer solution 11 is changed by the irradiation of the first light. In the fourth step, the amount of the target substance 21 is measured based on the change in pH of the second buffer solution 11 caused by the irradiation of the first light.

3. Examples (3-1) Production of the Complex 3

A solution was prepared by dissolving DOPC, DPPC, DSPE-PEG(2000)-DBCO, AzoTAB, and cholesterol in an organic solvent such as chloroform. The concentration of DOPC in the solution was 0.3 millimolar (mM). The concentration of DPPC in the solution was 0.3 mM. The concentration of DSPE-PEG(2000)-DBCO in solution was 0.036 mM. The concentration of AzoTAB in the solution was 0.2 mM. The concentration of cholesterol in the solution was 0.4 mM.

Next, the prepared solution was poured into a test tube and the organic solvent was evaporated to prepare a laminated membrane on the bottom of the test tube. The laminated membrane was a bimolecular membrane. Next, the first buffer solution 9 was added to the test tube. Then, the laminated membrane was separated from the test tube and turned into vesicles to obtain the membranes 13 of the photoresponsive liposomes 7. The method for forming the membrane 13 is a laminated membrane hydration method.

The first buffer solution 9 was prepared by mixing 10 mM HEPES and 180 mM trehalose and adjusting the pH of the mixture to 8.5. The name of HEPES is 4-(2-hydroxyethyl)-1-piperazineethanesulphonic acid. The osmotic pressure of the first buffer solution 9 was 220 mOsm/kg.

Next, the FcIII peptide (SEQ ID NO: 1) was immobilized on the surface of each of the membranes 13. The FcIII peptide corresponds to the membrane binding site 14. The second cysteine and twelfth cysteine from the N-terminus in the amino acid sequence of the FcIII peptide are coupled with oxidizing disulfide bonds. As a result, the FcIII peptide was formed into a cyclic peptide. The FcIII peptide is bindable to IgG. IgG is one type of immunoglobulin. IgG corresponds to the target substance 21.

The method for immobilizing the FcIII peptide on the surface of the membrane 13 is as follows. The N-terminus of the FcIII peptide was modified with an azide group.

Next, the FcIII peptide is immobilized to the surface of the membrane 13 by forming a covalent bond between the azide group and DBCO group of DSPE-PEG(20000-DBCO) dispersed in the membrane 13 with click chemistry. By the above steps, the photoresponsive liposomes 7 were obtained. Next, the photoresponsive liposomes 7 were subjected to external solution replacement at an ambient temperature. The external solution replacement is to replace the liquid existing outside of the photoresponsive liposomes 7 with another liquid. The liquid existing outside of the photoresponsive liposomes 7 was replaced with the second buffer solution 11 by external solution replacement.

The second buffer solution 11 was a mixed solution consisting of 10 mM HEPES and 180 mM glucose. The osmotic pressure of the second buffer solution 11 was the same as the osmotic pressure of the first buffer solution 9. The osmotic pressure of the second buffer solution 11 can be adjusted by adding sodium chloride to the second buffer solution 11. The pH of the second buffer solution 11 was 5.0.

In this example, the external solution was replaced by centrifugation. The centrifugal force in the centrifugation was 2000×g. The centrifugation was performed for 2 minutes. In this example, the external solution replacement was repeated for 3 times. The replacement of the external solution may be performed with a method other than centrifugation. Examples of the method for replacing the external solution include ultrafiltration and gel filtration. The complex 3 was obtained by the above steps.

(3-2) Preparation of the Supporter 5 to Which the Supporter Binding Sites 6 are Immobilized A silicon substrate was prepared. The surface of the silicon substrate was classified into 128×128 squares. A potential detection unit was formed in each square. The potential detection unit had a structure in which a silicon oxide membrane and a silicon nitride membrane were laminated in this order on the silicon substrate. The supporter 5 was obtained by the above steps. The supporter 5 is configured such that a surface potential can be detected for each potential detection unit.

Next, DNA aptamers (SEQ ID NO: 2) were immobilized to the surface of the supporter 5. The DNA aptamers correspond to the supporter binding sites 6. DNA aptamers correspond to molecular recognition materials. The 5'-end of the DNA aptamer is modified with an azide group. The DNA aptamer is bindable to IgG. A site of IgG to which the DNA aptamer is bindable is different from the site to which the FcIII peptide binds.

The method for immobilizing the DNA aptamers to the surface of the supporter 5 was as follows. First, the surface of the supporter 5 was treated with hot water to be hydrophilic. Next, the surface of the supporter 5 was coated with saturated 3-aminopropyltriethoxysilane with the silane coupling. Next, dibenzocyclooctyne-N-hydroxysuccinimidyl ester was added to substitute the amino group of 3-aminopropyltriethoxysilane with a dibenzocyclooctyne group. Next, the DNA aptamer whose 5'-end was modified with the azide group was immobilized to the surface of the supporter 5. The method of immobilizing the supporter binding sites 6 to the supporter 5 may be another method.

(3-3) Implementation of Measurement Method

A buffer solution containing IgG (hereinafter referred to as an IgG-containing buffer solution) was added dropwise to the surface of the supporter 5 produced in the method (3-2) which was described above. The pH of the IgG-containing buffer was 5.0. The composition of the IgG-containing buffer solution was the same as that of the second buffer solution 11 except for containing IgG.

The composition of the IgG-containing buffer solution may be different from the composition of the second buffer solution 11 except for containing IgG. However, the pH of the IgG-containing buffer solution is preferably the same as the pH of the second buffer solution 11. When the pH of the IgG-containing buffer solution 11 is equal to the pH of the second buffer solution 11, it becomes easy to measure the change in pH in a later step.

10 mM of IgG-containing buffer solution and 50 mM of IgG-containing buffer solution were prepared. Further, as a comparative example, the second buffer solution 11 containing no IgG was added dropwise to the surface of the supporter 5.

Next, the complex 3 prepared in the method (3-1) which was described above was dropped onto the surface of the supporter 5. After the dropping, the supporter 5 was left to stand for 60 minutes.

Next, the surface of the supporter 5 was washed for the three times with a washing buffer solution, and as a result, the unbound photoresponsive liposomes 7 that have not immobilized to the supporter 5 were removed. The composition of the washing buffer solution was the same as that of the second buffer solution 11. The pH of the washing buffer solution was 5.0.

Next, the surface of the supporter 5 was immersed in 100 μL of the second buffer solution 11. Next, as shown in FIG.

5, a reference electrode 23 was inserted into the second buffer solution 11 that is in contact with the surface of the supporter 5. The reference electrode 23 was a silver/silver chloride reference electrode. Specifically, the reference electrode 23 was 66-EE009 manufactured by ESA. After inserting the reference electrode 23, the pH measurement of the second buffer solution 11 was started.

The surface potential of the supporter 5 before irradiation of the ultraviolet light was measured. Hereinafter, the surface potential at this time is referred to as an initial surface potential. The initial surface potential was about 745 mV.

Next, as shown in FIG. 5, the entire area of the supporter 5 was irradiated with the ultraviolet light for 5 seconds. The wavelength peak of the ultraviolet light was 365 nm. The irradiation intensity of the ultraviolet light was 120 µW per irradiation area of 100 µm×100 µm.

After irradiation of the ultraviolet light, the surface potential of the supporter 5 was measured. Hereinafter, the surface potential after the irradiation of the ultraviolet light is referred to as the surface potential after light irradiation. When the concentration of IgG in the IgG-containing buffer solution was 10 nM, the surface potential after light irradiation decreased by about 3.75 mV as compared with the initial surface potential. When the concentration of IgG in the IgG-containing buffer solution was 50 nM, the surface potential after light irradiation decreased by 10.60 mV as compared with the initial surface potential. When only the second buffer solution 11 was dropped onto the supporter 5 instead of the IgG-containing buffer solution, the surface potential after light irradiation was the same as the initial surface potential. The measurement results are shown in Table 1.

TABLE 1

| IgG concentration (nM) | Surface potential variation (mV) | Standard deviation (±SD) (mV) |
|---|---|---|
| 0 | 0 | 0.12 |
| 10 | −3.75 | 0.62 |
| 50 | −10.63 | 2.87 |

The "surface potential variation" in Table 1 means a value obtained by subtracting the initial surface potential from the surface potential after light irradiation. The "standard deviation" in Table 1 means the standard deviation of the "surface potential variation" calculated multiple times. The reason why the surface potential decreases after light irradiation when the IgG-containing buffer solution is dropped on the surface of the supporter 5 is as follows. When the photoresponsive liposomes 7 immobilized to the supporter 5 was irradiated with the ultraviolet light as shown in FIG. 5, the membrane pores 19 were formed in the photoresponsive liposomes 7 as shown in FIGS. 3 and 5. Then, the first buffer solution 9 was released to the outside of the photoresponsive liposomes 7 through the membrane pores 19 and mixed with the second buffer solution 11. The pH of the first buffer solution 9 is higher than the pH of the second buffer solution 11. As a result, the pH of the second buffer solution 11 was increased.

According to Nernst equation as shown in Equation 1, the variation in surface potential and the variation in pH are in a negative proportional relationship. Therefore, the pH of the second buffer solution 11 was increased, so that the surface potential after light irradiation was decreased.

$$E_H = E - E_0 = \frac{RT}{nF}\ln a_{H+} = 0.059 \times \text{pH} \quad \text{[Equation 1]}$$

The density of the DNA aptamers immobilized on the supporter 5 is preferably not high enough to interfere with the binding between the DNA aptamers and IgG. Further, the density of the DNA aptamers immobilized on the supporter 5 is preferably high enough to detect IgG. The density of the DNA aptamers immobilized on the supporter 5 can be arbitrarily controlled.

The size of the membrane 13 is preferably not large enough to interfere with the binding between the FcIII peptide and IgG. Further, the membrane 13 preferably large enough to hold an amount of the first buffer solution 9 that enables detection of IgG. The size of the membrane 13 can be arbitrarily controlled.

4. Effects of the Photoresponsive Liposomes 7, the Complex 3, the Measurement System 1, and the Measurement Method (1A) The photoresponsive liposomes 7 form the membrane pores 19 when irradiated with the first light, and release the first buffer solution 9 outward. The released first buffer solution 9 is mixed with the second buffer solution 11. Since the composition of the first buffer solution 9 is different from the composition of the second buffer solution 11, the composition of the second buffer solution 11 is changed by being mixed with the released first buffer solution 9. The measurement system 1 is configured to measure the amount of the target substance 21 based on the change in the composition of the second buffer solution 11. Therefore, the measurement system 1 enables to detect the amount of the target substance 21 without performing complicated processes.

(1B) The phospholipid 15 constituting the membrane 13 is, for example, one containing a phospholipid having an unsaturated hydrocarbon chain and a phospholipid having a saturated hydrocarbon chain. In this case, phase separation occurs in the plane of the liposome membrane at the operating temperature of the photoresponsive liposome 7, so that an ordered phase and a disordered phase can coexist.

(1C) The azobenzene compound 17 constituting the membrane 13 is, for example, AzoTAB. In this case, the collapse of the liposome membrane can be induced by the cis-trans isomerization of AzoTAB.

(1D) For example, there is an ionic gradient between the first buffer solution 9 and the second buffer solution 11. In this case, when the photoresponsive liposomes 7 are irradiated with the first light, the ion concentration of the second buffer solution 11 changes. The measurement system 1 can measure the amount of the target substance 21 based on the change in the ion concentration in the second buffer solution 11.

(1E) For example, there is a proton gradient between the first buffer solution 9 and the second buffer solution 11. In this case, when the photoresponsive liposomes 7 are irradiated with the first light, the pH of the second buffer solution 11 changes. The measuring system 1 can measure the amount of the target substance 21 based on the change in pH in the second buffer solution 11.

5. Other Embodiments

Although the embodiments of the present disclosure have been described above, the present disclosure is not limited to the embodiments described above, and various modifications can be made to implement the present disclosure.
(1) Multiple functions of one constituent element in the above embodiment may be realized by multiple constituent elements, or a single function of one constituent element may be realized by multiple constituent elements. Further, multiple functions of multiple elements may be implemented by one element, or one function implemented by multiple elements may be implemented by one element. A part of the configuration of the above embodiments may be omitted. At least a part of the configuration of the above embodiments may be added to or replaced with another configuration of the above embodiments.
(2) The present disclosure can also be realized in various forms such as products and systems having the above-mentioned photoresponsive liposomes and the complex as constituents thereof other than the photoresponsive liposomes and the complex described above.

2. The complex according to claim 1, wherein the phospholipid includes a phospholipid having an unsaturated hydrocarbon chain and a phospholipid having a saturated hydrocarbon chain.

3. The complex according to claim 1 wherein the azobenzene compound includes azobenzene trimethylammonium bromide.

4. The complex according to claim 1, wherein an ion-gradient exists between the first buffer solution and the second buffer solution.

5. The complex according to claim 4, wherein the ion-gradient is a proton-gradient.

6. A method for measuring an amount of a target substance, the method comprising:
applying a liquid that contains the target substance to a supporter to which a plurality of supporter binding sites are immobilized, each of the plurality of supporter binding sites being bindable to a first portion of the target substance; and
adding the target substance to the complex according to claim 1;
after applying the liquid that contains the target substance to the supporter and adding the target substance to the complex, removing an unbound photoresponsive liposome from the plurality of photoresponsive liposomes,

---

---

What is claimed is:

1. A complex comprising:
a plurality of photoresponsive liposomes each including:
a membrane that contains azobenzene compound and phospholipid; and
a membrane binding site that is immobilized to the membrane and bindable to a target substance;
a first buffer solution that exists inside the plurality of photoresponsive liposomes; and
a second buffer solution that exists outside of the plurality of photoresponsive liposomes, wherein
the first buffer solution has a composition that is different from that of the second buffer solution.

the unbound photoresponsive liposome being a photoresponsive liposome that is not immobilized to the supporter;
after removing the unbound photoresponsive liposome, forming a membrane pore in each of a remaining plurality of photoresponsive liposomes by irradiating the remaining plurality of photoresponsive liposomes with light in a state where the first buffer solution exists inside the remaining plurality of photoresponsive liposomes and the second buffer solution exists outside of the remaining plurality of photoresponsive liposomes; and then measuring the amount of the target substance in accordance with a change in the composition of the second buffer solution, the change being caused by the light irradiation.

7. The method according to claim 6, wherein a proton-gradient exists between the first buffer solution and the second buffer solution before the light irradiation, and the amount of the target substance is measured in accordance with a change in pH of the second buffer solution caused by the light irradiation.

* * * * *

SEQUENCE LISTING

```
<160> NUMBER OF SEQ ID NOS: 2

<210> SEQ ID NO 1
<211> LENGTH: 13
<212> TYPE: PRT
<213> ORGANISM: Artificial Sequence
<220> FEATURE:
<223> OTHER INFORMATION: Synthetic

<400> SEQUENCE: 1

Asp Cys Ala Trp His Leu Gly Glu Leu Val Trp Cys Thr
1               5                   10

<210> SEQ ID NO 2
<211> LENGTH: 85
<212> TYPE: DNA
<213> ORGANISM: Artificial Sequence
<220> FEATURE:
<223> OTHER INFORMATION: Synthetic

<400> SEQUENCE: 2
taatacgact cactatagca atggtacggt acttccccac tcaccgggta cctgccgctc        60
ccaaaagtgc acgctacttt gctaa                                              85
```